US012554541B2

(12) United States Patent
Han et al.

(10) Patent No.: US 12,554,541 B2
(45) Date of Patent: Feb. 17, 2026

(54) SYSTEMS AND METHODS FOR PROVIDING CONTEXTUAL NOTIFICATIONS

(71) Applicant: The Toronto-Dominion Bank, Toronto (CA)

(72) Inventors: Dong Woo Han, Burlington (CA); Jessica Marie Porciello, Campbelville (CA)

(73) Assignee: The Toronto-Dominion Bank, Toronto (CA)

( * ) Notice: Subject to any disclaimer, the term of this patent is extended or adjusted under 35 U.S.C. 154(b) by 773 days.

(21) Appl. No.: 17/894,433

(22) Filed: Aug. 24, 2022

(65) Prior Publication Data

US 2024/0069972 A1  Feb. 29, 2024

(51) Int. Cl.
*G06F 9/50* (2006.01)

(52) U.S. Cl.
CPC .................................. *G06F 9/5033* (2013.01)

(58) Field of Classification Search
None
See application file for complete search history.

(56) References Cited

U.S. PATENT DOCUMENTS

| 9,009,167 | B2 | 4/2015 | Cerny |
| 9,390,453 | B2 | 7/2016 | Votaw et al. |
| 9,639,893 | B2 | 5/2017 | Votaw et al. |
| 10,002,395 | B2 | 6/2018 | Votaw et al. |
| 10,915,959 | B2 | 2/2021 | Sokol et al. |
| 2013/0030994 | A1 | 1/2013 | Calman et al. |
| 2014/0316829 | A1 | 10/2014 | Bumbernick |
| 2015/0088716 | A1 | 3/2015 | Votaw et al. |
| 2016/0253702 | A1 | 9/2016 | Gonzales, Jr. |
| 2017/0323404 | A1 | 11/2017 | Tiwari et al. |
| 2019/0066059 | A1* | 2/2019 | McSwiggan ....... G06Q 10/1095 |
| 2019/0378207 | A1 | 12/2019 | Dibner-Dunlap et al. |
| 2020/0244082 | A1* | 7/2020 | Chai ................... H04L 63/0876 |
| 2022/0353635 | A1* | 11/2022 | Garg ....................... H04W 8/14 |
| 2023/0229986 | A1* | 7/2023 | Cami ............... G06Q 10/06312 705/7.15 |

* cited by examiner

*Primary Examiner* — Eric C Wai
(74) *Attorney, Agent, or Firm* — Rowand LLP

(57) ABSTRACT

A computer-implemented method is disclosed. The method includes: receiving, via a user device, input of parameters associated with a schedule item and a resource allocation; obtaining account data of a resource account associated with the user device; generating a first schedule of recommended activities for the schedule item based on the inputted parameters and the account data of the resource account, the first schedule identifying one or more activities and an order associated with the one or more activities; obtaining real-time context data associated with the user device; detecting a deviation from the first schedule based on the real-time context data; and in response to detecting the deviation, providing, via the user device, a first notification including indications of the detected deviation and a recommendation of a second schedule of activities.

20 Claims, 6 Drawing Sheets

SYSTEMS AND METHODS FOR PROVIDING CONTEXTUAL NOTIFICATIONS

TECHNICAL FIELD

The present application relates to resource account management and, more particularly, to a system and methods for providing real-time contextual notifications in connection with resource accounts.

BACKGROUND

Resource budgeting tools are used generally for creating and managing budgets. A resource budget identifies various uses of resources and indicates an allocation of a limited quantity of resources to the identified uses. As a particular example, a system resource budget may indicate resource costs associated with executing one or more computing tasks and an allocation of a limited quantity of system resources (e.g., processing and memory resources) to the computing tasks. While budgeting tools may be useful for high-level, static planning of resource distribution, they are generally limited in providing real-time feedback regarding budget constraints and resource account activity.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
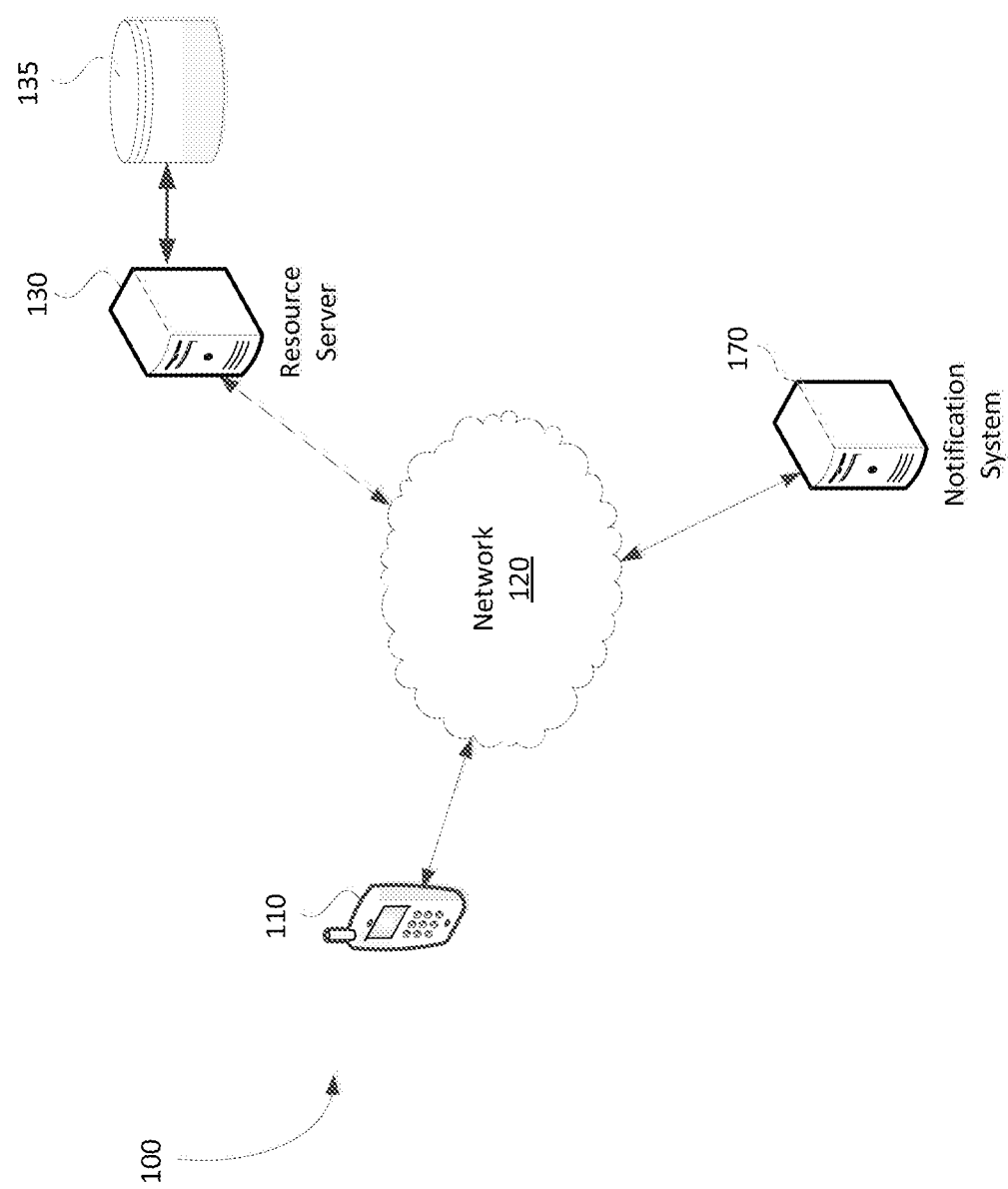
FIG. 1 is a schematic operation diagram illustrating an operating environment of an example embodiment.

In an aspect, the present application discloses a computing system. The computing system includes a processor and a memory coupled to the processor. The memory stores computer-executable instructions that, when executed by the processor, configure the processor to: receive, via a user device, input of parameters associated with a schedule item and a resource allocation; obtain account data of a resource account associated with the user device; generate a first schedule of recommended activities for the schedule item based on the inputted parameters and the account data of the resource account, the first schedule identifying one or more activities and an order associated with the one or more activities; obtain real-time context data associated with the user device; detect a deviation from the first schedule based on the real-time context data; and in response to detecting the deviation, provide, via the user device, a first notification including indications of the detected deviation and a recommendation of a second schedule of activities.

In some implementations, generating the recommendation of the first schedule may include providing, to the user device for display thereon, display data associated with a map interface, the display data including graphical representations of the one or more activities.

In some implementations, the display data may include indications of locations and projected costs associated with the one or more activities.

In some implementations, the real-time context data may include a current location of the user device.

In some implementations, detecting the deviation may include defining geofences relative to projected routes associated with the first schedule and detecting triggers using the geofence data.

In some implementations, providing the first notification may include generating a message identifying the deviation and the recommendation of the second schedule of activities and transmitting the message to the user device.

In some implementations, the instructions, when executed, may further configure the processor to detect one or more trigger conditions with respect to the account data of the resource account and providing second notifications to the user device in response to detecting the one or more trigger conditions.

In some implementations, detecting the one or more trigger conditions may include determining a current balance associated with the resource account and comparing the current balance with a defined threshold value.

In some implementations, the instructions, when executed, may further configure the processor to obtain account operations data for the resource account during a first time period associated with the schedule item and the recommendation of the second schedule of activities may be generated based on the account operations data.

In some implementations, detecting the deviation from the first schedule may include receiving, via the user device, a request for activity data of at least one activity that is not included in the first schedule.

In another aspect, a computer-implemented method is disclosed. The method includes: receiving, via a user device, input of parameters associated with a schedule item and a resource allocation; obtaining account data of a resource account associated with the user device; generating a first schedule of recommended activities for the schedule item based on the inputted parameters and the account data of the resource account, the first schedule identifying one or more activities and an order associated with the one or more activities; obtaining real-time context data associated with the user device; detecting a deviation from the first schedule based on the real-time context data; and in response to detecting the deviation, providing, via the user device, a first notification including indications of the detected deviation and a recommendation of a second schedule of activities.

In another aspect, a non-transitory computer readable storage medium is disclosed. The computer readable storage medium contains instructions thereon that, when executed by a processor, configure the processor to: receive, via a user device, input of parameters associated with a schedule item and a resource allocation; obtain account data of a resource account associated with the user device; generate a first schedule of recommended activities for the schedule item based on the inputted parameters and the account data of the resource account, the first schedule identifying one or more activities and an order associated with the one or more activities; obtain real-time context data associated with the user device; detect a deviation from the first schedule based on the real-time context data; and in response to detecting the deviation, provide, via the user device, a first notification including indications of the detected deviation and a recommendation of a second schedule of activities.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Resource management generally involves budgeting of a limited quantity of resources associated with a resource account. As used herein, the term "resource" encompasses any resource of limited availability. Resource types may include stored value (e.g., fiat currency), computing or system resources (e.g., processing units, memory, disk), digital resources (e.g., non-fungible tokens), and the like. A resource owner may create a budget to plan the usage or allocation (e.g., expenditure) of their resources during a defined period of time. A typical resource budget includes indications of estimated inflow and outflow of resources, for example, in connection with a particular resource account. By budgeting, resource owners can deploy their resources to various purposes, such as tasks, operations, expense categories, etc., while retaining control over the total quantity of remaining resources. In particular, budgeting provides a systematic way of planning, tracking, and otherwise coordinating deployment of limited resources.

Resource owners may endeavor to obtain information that is relevant to effective budgeting of their resources. For example, a resource owner may arrange for messages, such as push notifications, relating to their resource account to be delivered to devices associated with the resource owner. Account-related notifications typically convey information regarding static changes in account data of a resource account. By way of example, in the context of a financial resource (i.e., banking) account, notifications of account activity affecting a resource balance of the account may be automatically generated and provided to the resource/account owner. Such account activity may include, for example, resource withdrawal and deposit operations that are initiated by an authorized user of the resource account.

Account-related notifications may be provided responsive to some triggering conditions or activities associated with a resource account. An example trigger condition is a "threshold limit exceeded" condition. For example, if a resource expense amount for a specific time period (e.g., daily amount, weekly amount, etc.) is determined to exceed a defined threshold, a notification indicating the condition may be provided to the resource owner. While such reactionary notifications may be useful for flagging certain detected conditions, they are limited for the purpose of informing or affecting future actions of resource owners. In particular, existing resource account management systems are not adapted for generating "anticipatory" notifications for resource owners. Anticipatory notifications refer to notifications that relate to some future, projected, and/or recommended state(s) of a resource account. For example, an anticipatory notification may be in the form of a set of recommendations for a planned or desired allocation of resources associated with a resource account.

Further, existing systems are generally not equipped to provide dynamic notifications based on context data (e.g., geographic location) associated with the resource owner and/or their device(s). Dynamic notifications may provide anticipatory information for supporting account- and budget-specific decisions in real-time. Relatedly, it is further desired to provide budgeting and/or scheduling tools that are designed to dynamically update based on real-time feedback of resource account activity data.

The present application describes solutions for addressing some of the aforementioned technical limitations associated with traditional resource account management systems.

Reference is first made to FIG. 1 which illustrates an example networked computing environment 100 consistent with certain disclosed embodiments. As shown in FIG. 1, the computing environment 100 may include client devices 110, a resource server 130, a database 135 associated with the resource server 130, a notification system 170, and a communication network 120 connecting one or more of the components of networked environment 100.

A resource server 130 (which may also be referred to as a server computer system) and client devices 110 communicate via the network 120. In at least some embodiments, the client device 110 is a computing device. The client device 110 may take a variety of forms including, for example, a mobile communication device such as a smartphone, a tablet computer, a wearable computer such as a head-mounted display or smartwatch, a laptop or desktop computer, or a computing device of another type. The client device 110 is associated with a client entity (e.g., an individual, an organization, etc.) having resources that are managed by or using the resource server 130. For example, the resource server 130 may be a financial institution server and the client entity may be a customer of a financial institution operating the financial institution server. The client device 110 may store software instructions that cause the client device to establish communications with one or more web servers and the resource server 130.

The resource server 130 may track, manage, and maintain resources, make lending decisions, and/or lend resources to a client entity associated with the client device 110. The resources may, for example, be system resources, such as memory or processor cycles. In at least some embodiments, the resources may include stored value, such as fiat currency, which may be represented in a database. For example, the resource server 130 may be coupled to a database 135, which may be provided in secure storage. The secure storage may be provided internally within the resource server 130 or externally. The secure storage may, for example, be provided remotely from the resource server 130. For example, the secure storage may include one or more data centers storing data with bank-grade security.

The database 135 may include records for a plurality of accounts and at least some of the records may define a quantity of resources associated with the client entity. For example, the client entity may be associated with an account having one or more records in the database 135. The records may reflect a quantity of stored resources that are associated with the client entity. Such resources may include owned resources and, in at least some embodiments, borrowed resources (e.g., resources available on credit). The quantity of resources that are available to or associated with the client entity may be reflected by a balance defined in an associated record such as, for example, a bank balance.

In at least some embodiments, the database 135 may store various types of information in connection with customers of a business entity that administers the resource server 130. For example, the database 135 may store customer profile data and financial account data associated with customers. The customer profile data may include, without limitation, personal information of registered customers, authentication credentials of the customers, account identifying information (e.g., checking account, savings account, revolving credit line, etc.), and information identifying services (e.g., banking services, investment management services, etc.) and/or programs that are offered to the customers by the business entity. The financial account data may include portfolio data relating to portfolios of investments that are held by customers. A customer's portfolio data may include, for example, information identifying actual positions held by the customer in various securities, information identifying a "virtual" portfolio composed of simulated positions held by the customer in various securities, and "watch lists" specifying various securities that are monitored by the customer.

The business entity associated with the resource server 130 may provide services that are accessible to the client entity. For example, the business entity may provide account management services, financial transaction services, and investment management services for the client entity. In at least some embodiments, the resource server 130 may be configured to provide a user interface that allows client devices 110 to access some of the services offered by the business entity. By way of example, the resource server 130 may be configured to provide a website or web-based portal which can be accessed via the client device 110. The website (or portal) may include web content corresponding to various services offered by the business entity, and the resource server 130 may provide the web content for display on the client devices 110. As another example, the resource server 130 may be associated with a software application which may be installed and/or run on the client devices 110. In some embodiments, the resource server 130 may be a backend server associated with software (e.g., a mobile app, web application, etc.) which may be accessed on the client device 110. The software may, for example, be a mobile banking, investment management, or personal finance management application. A graphical user interface (GUI) associated with the application may present the content corresponding to the services offered by the business entity on a display associated with the client device 110. A customer may interact with the business entity and its service offerings via the GUI of the application.

The notification system 170 is a computer system that coordinates real-time generation and delivery of notifications to various devices of the computing environment 100. In at least some embodiments, the notification system 170 cooperates with the resource server 130 in generating account-related notifications for owners of resource accounts at the resource server 130. The notification system 170 may be configured to obtain account information associated with resource accounts and generate notifications based on the account information for delivery to owners of the resource accounts. For example, notifications may be generated by the notification system 170 responsive to detecting certain defined conditions relating to resource account data, such as account balance, resource allocations, and the like. The type and content of notifications may be determined by the notification system 170 in conjunction with the resource server 130.

In some embodiments, the notification system 170 may obtain additional information relating to owners of resource accounts when generating account-related notifications. As an example, the notification system 170 may obtain context data associated with client devices 110 of the account owners. A device's context data comprises contextual information about the device and/or its user. The context data represents information that provides a broader understanding of the device, its user(s), and background or environment. For example, the context data may indicate, for a client device: type of device, current device location, identity of device user, historical device usage, sensor data (e.g., orientation, acceleration, etc.), direction of motion, travel path and trajectory, and the like. The notification system 170 may use context data associated with a client device and account information for a resource account to generate notifications for the relevant account owner.

As another example, the notification system 170 may be configured to obtain schedule data for one or more resource account owners. In some embodiments, schedule data may comprise calendar data associated with a scheduling or calendar application on a client device. The schedule data may indicate, for example, past and upcoming events, event details (e.g., location, start and end times, guests, itinerary, etc.), and the like. The notification system 170 may combine an account owner's schedule data, device context data, and resource account information in determining timing, type, and content of notifications to generate for delivery to the account owners.

While FIG. 1 illustrates the notification system 170 as a distinct component of the computing environment 100, in some embodiments, the notification system 170 and/or certain ones of its functions may be implemented by the resource server 130. For example, the resource server 130 may perform notification functions for account owners of resource accounts at the resource server 130.

The client device 110, the resource server 130, and the notification system 170 may be in geographically disparate locations. Put differently, the client device 110 may be remote from the resource server 130 and/or the notification system 170. As described above, the client device 110, the resource server 130, and the notification system 170 may be computer systems.

The network 120 is a computer network. In some embodiments, the network 120 may be an internetwork such as may be formed of one or more interconnected computer networks. For example, the network 120 may be or include an Ethernet network, an asynchronous transfer mode (ATM) network, a wireless network, or the like.

Figure 2A:
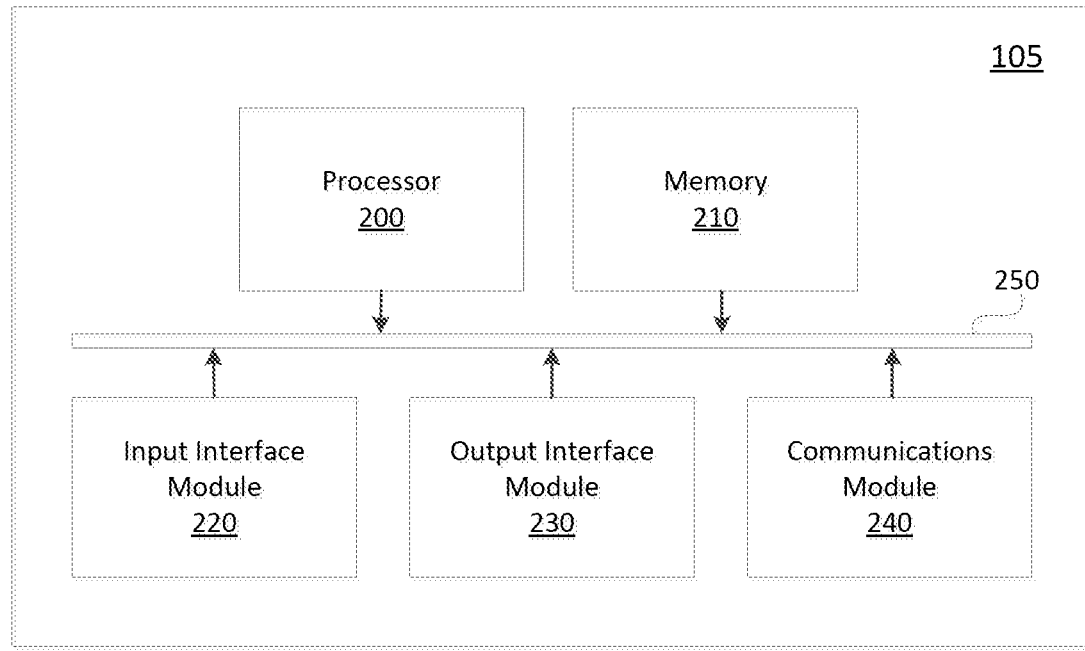
FIG. 2A is a high-level schematic diagram of an example computing device.

FIG. 2A is a high-level operation diagram of an example computing device 105. In some embodiments, the example computing device 105 may be exemplary of one or more of: the client device 110, the resource server 130, and the notification system 170. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned examples of input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communication networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
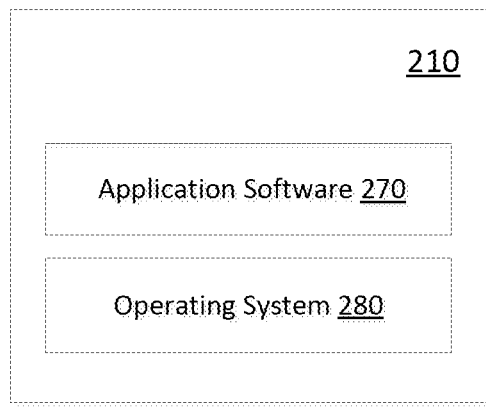
FIG. 2B is a schematic block diagram showing a simplified organization of software components stored in memory of the example computing device of FIG. 2A.

FIG. 2B depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230, and the communications module 240. The operating system 280 may, for example, be Apple™ OS X, Android™, Microsoft Windows™, a Linux distribution, or the like.

The application software 270 adapts the example computing device 105, in combination with the operating system 280, to operate as a device performing particular functions. The application software 270 may, for example, comprise a resource allocation application. A resource allocation application may be used to define operations, tasks, or objectives associated with the client device 110 and/or a user of the client device 110, and to allocate various quantities of resources to the defined operations, tasks, or objectives. In some embodiments, the resource allocation application may be a job scheduler application for managing device operations, such as tasks and background services, and allocating quantities of system resources to the device operations. A job scheduler may be used to control which tasks (e.g., applications, system processes, etc.) and background services are actively running on the client device 110, and to manage, in real-time, the allocation of system resources to those tasks or services. For example, the job scheduler may allow users to define parameters for controlling the quantities of system resources that can be consumed by individual tasks and services.

As another example, the resource allocation application may be a personal finance management (PFM) application. A PFM application allows users to track expenses, balances, and savings, and facilitates personal budgeting. For example, a PFM application may be used to define budget constraints (e.g., weekly or monthly spending limits), analyze historical and projected spending data, and to define various savings goals in connection with one or more banking accounts. In some embodiments, a PFM application may maintain a list (e.g., "wish list") of savings goals defined by a user. The savings goals may be tied to a specific banking account. The PFM application allocates funds of the selected banking account to user-defined savings goals. For example, the savings balance and future deposits in a selected savings account may be allocated to the user's savings goals based on one or more allocation rules (e.g., percentages, ratios, etc.) defined by the user. The PFM ensures that savings balance and deposits of the selected account are allocated according to user-defined percentages.

A savings goal may be defined, via freeform text input or selection from a picklist of common or suggested goals. The GUI of a PFM application may enable a user to input various details about a savings goal. In some embodiments, a picklist of goals may be generated based on personal data associated with a user of the PFM application. For example, the picklist may contain only those goals which are determined to be relevant for the user based on the user's personal information (e.g., age, marital status, employment status, etc.) and/or historical transactions data (e.g., past purchases, ongoing payments, etc.). The savings goals of the picklist may be presented in accordance with an order, or a priority ranking, which may also be determined based on the user's personal data. For example, a goal to save for a downpayment may be listed or ordered in the picklist with a higher priority for a user of a particular age but may be de-prioritized or excluded altogether for a user of a different age (i.e., an age that is not considered to be a first-time homebuying age).

A PFM application may allow users to define threshold quantities of resources associated with the selected savings goals. A threshold quantity may, for example, be a quantity of resources that is required to complete a particular savings goal. By way of example, if a savings goal is associated with a specific activity (e.g., vacation), the threshold quantity specified by the user may be an expected resource cost of performing the activity.

In some embodiments, the resource allocation application may include or implement a schedule recommendation module. As part of the resource allocation application, a software component for generating recommended schedule data may be provided. Schedule data comprises information for describing and managing a schedule such as schedule milestones and activities, activity attributes, related constraints and assumptions, and the like. The resource allocation application may generate schedule recommendations based on, at least, account data of a resource account and user input of schedule parameters. For example, a schedule of recommended activities may be generated by the resource allocation application in response to a user request for recommendations. The user request may include schedule and/or activity parameters and identification of a resource account associated with the user. The resource allocation application may generate schedule data identifying one or more recommended schedule activities based on the user-inputted parameters and any constraints (e.g., budget constraints) associated with the resource account.

The resource allocation application may be a stand-alone application, such as a mobile app, or integrated into another application or software module resident on the example computing device 105 as a sub-function or feature. In some embodiments, features of the resource allocation application may be integrated into a personal banking application. For example, the resource allocation application may be a component of software for managing personal accounts on servers of a bank institution.

The resource allocation application is associated with a backend application server. In at least some embodiments, a resource server (such as resource server 130 of FIG. 1) may also serve as the backend application server for the resource allocation application. In particular, various functions of the resource allocation application may be provided, at least in part, by a resource server. For example, a server associated with a financial institution may perform backend services of the resource allocation application. The financial institution server may be configured to, for example, access personal finance information for a client, receive financial goals data from the client, determine initial allocation of resources to one or more financial goals, and configure re-allocations of resources or generate offers to lend additional resources to the client.

Figure 3:
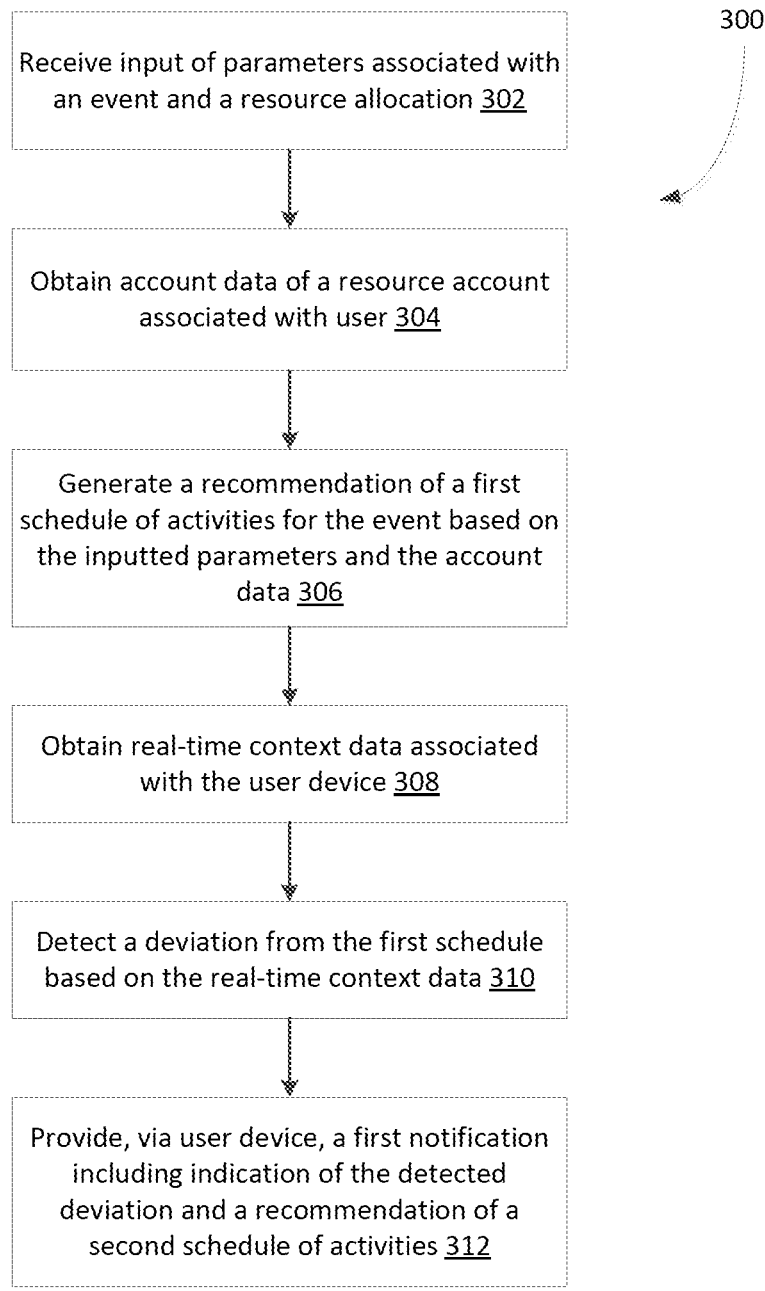
FIG. 3 shows, in flowchart form, an example method for providing contextual notifications in connection with a resource account.

Reference is made to FIG. 3 which shows, in flowchart form, an example method 300 for providing contextual notifications in connection with a resource account. As a specific and non-limiting example, the method 300 may be implemented in generating notifications relating to a defined schedule of a user such as, for example, a schedule of recommended activities for the user. The notifications are generated based on, at least, account data of a resource account associated with the user and context data associated with a device of the user. The operations of method 300 may be performed by a client device (e.g., by software resident on a device), either alone or in conjunction with one or more computer server systems. For example, a client device that is used for a scheduling or resource budgeting session may perform one or more client-side operations of method 300 and a server, such as the resource server 130 of FIG. 1, that acts as a backend for a scheduling and/or resource account management application may perform certain server-side operations of method 300.

In some embodiments, a client device or a server may perform all of the operations of method 300. In particular, computer-executable instructions stored in memory of a client device (or a server computer) may, when executed by a processor of the client device (or server), configure the processor to perform the operations of method 300. The instructions corresponding to the operations of method 300 may be executed, for example, as part of software that is operable for providing notifications on the client device.

In operation 302, the processor receives, via a user device, input of parameters associated with a schedule item and a resource allocation. The user device is a computing device of an entity that is associated with the resource account. For example, the user device may be a computing device associated with one or more resource owners and/or authorized users of the resource account. The parameters may be input as part of a user request to create a recommended itinerary. For example, a user may wish to create an itinerary that outlines a schedule of operations, such as system operations, for a computing task. As another example, a user may request to create an itinerary that enumerates recommended activities for a social event, such as a party, date, etc. The user can input various parameters (or criteria) of a desired itinerary such as, for example, start date and time, end date and time, number of attendees, geographic location, type(s) of activities, and the like. The parameters may be input using the user device; in particular, an application such as a resource allocation application or a scheduling application on the user device may be used to generate the user request.

A resource allocation is also specified, or included, as part of the user request. In at least some embodiments, the resource allocation indicates a defined resource budget for the recommended itinerary. That is, the user request may indicate a resource budget associated with a schedule of activities that is requested to be created by the user. The resource budget represents a resource cost associated with performing the activities that are part of the recommended itinerary. For example, the resource budget may specify a maximum total resource cost, a minimum total resource cost, and/or a range of values for the total resource cost of the activities. Additionally, or alternatively, the resource budget may be expressed using one or more budget categories. The budget categories may, for example, correspond to descriptors of itinerary items (e.g., activities, operations, tasks, and the like) of the requested itinerary. In particular, the user input of the resource allocation may indicate values (i.e., maximum, minimum, range) for each of one or more budget categories associated with the requested itinerary.

In operation 304, the processor obtains account data of a resource account associated with the user and/or user device. The user associated with the request to create a recommended itinerary may own and/or control at least one resource account. The performance of activities that are included in a recommended itinerary may affect the account data of such resource account. For example, a recommended itinerary may include a plurality of activities that involve transfers of resources (e.g., payments) associated with the user's resource account. In particular, the transfers may correspond to the resource costs associated with the activities of the recommended itinerary. As such, it is desirable to process the account data of the user's resource account, in conjunction with any user-specified resource allocations, to determine information that is relevant for the user in regard to the recommended itinerary. Account data may indicate at least one of: account balance, resource type(s), types and number of accounts, constraints and conditions on account activity (e.g., daily transfer limits), and the like. As described below, the processor is configured to process the account data of a user's resource account and context data associated with the user and/or their device in generating contextual notifications associated with recommended itineraries for the user.

In operation 306, the processor generates a first schedule of recommended activities for the schedule item. The first schedule is generated based on the user inputted parameters and the account data of the resource account. The first schedule identifies one or more activities and an order (e.g., chronological order) associated with the one or more activities. The activities of the first schedule include those activities that are selected for inclusion in the recommended itinerary. In particular, the first schedule comprises schedule data that represents a response to the user's request for a recommended itinerary. The schedule data indicates certain minimum details about each of the one or more recommended activities such as activity class and/or type, activity identifier, geographic location, start and/or end date, and the like. The schedule data may additionally indicate other information about the one or more activities including: mode of transportation, transit information, travel routes, expected resource costs, and the like.

In at least some embodiments, the processor is configured to obtain additional information prior to providing the recommendations associated with the first schedule. For example, the processor may obtain activities data from a database storing activities information associated with a plurality of defined activities. The processor may, for example, query an activities database using an associated application programing interface (API) to retrieve the activities data. The database queries may be generated using the user inputted parameters for the requested itinerary. For example, the queries may be generated based on criteria including, at least, a resource budget, geographic location, and activity types that are specified as part of the request to create the recommended itinerary. The processor may obtain the results of the database query and select a subset of the results to present as part of the first schedule of recommended activities. In particular, the processor may filter the query results to identify those results that are determined to be most relevant for the requesting user. The identification of the subset of recommended activities may be processed using one or more defined rules, criteria, or heuristics. For example, the recommended activities may be identified based on criteria relating to geographical proximity (e.g., geographical distance from user device), resource cost (e.g., lowest cost activities), personal preference information, and historical activities and/or transactions data of the requesting user.

A user may confirm an association of the first schedule of recommended activities with the resource account. For example, the user may provide input for approving the recommended activities and for indicating an intent to link the first schedule with the resource account. Once the confirmation is received from the user, the schedule data of the first schedule may be stored in a data store in association with an identifier of the resource account.

In some embodiments, the processor may provide, to the user device for display thereon, display data associated with a map interface. The display data may include graphical representations of the one or more activities of the first schedule. In particular, the recommended activities of the first schedule may be graphically represented on the user device by providing the display data. The display data may include indications of identifiers, locations, and projected resource costs associated with the recommended activities that are included in the first schedule.

In operation 308, the processor obtains real-time context data associated with the user device. The real-time device context data may indicate at least one of: type of device, current device location, identity of device user, historical device usage, sensor data (e.g., orientation, acceleration, temperature, etc.), directional movement, travel path and trajectory, signal strength, and the like. The device location data may be obtained, for example, using a GPS chipset receiver. The device context data may be obtained by the processor on a periodic basis. For example, the processor may periodically communicate with the user device and request to receive certain subset(s) of context data of the user device. The device context data may be requested, for example, in accordance with a predetermined frequency or schedule.

In operation 310, the processor detects a deviation from the first schedule based on the real-time context data. A deviation from the first schedule represents a variance from the schedule data of the first schedule. For example, when at least one of a user's activities diverges from a timetable of recommended activities included in the first schedule, the processor may detect a deviation. An activity is determined to diverge from a timetable if the activity data, such as location, start time, etc., for the activity is identifiably different from the activity data of any recommended activity that is included in the first schedule.

In some embodiments, the processor may define geofences relative to projected routes associated with the first schedule. A projected route represents a route that includes a plurality of the recommended activities of the first schedule. A projected route indicates, at least, a start time, a starting location, and travel paths between locations associated with adjacent activities included in the first schedule. The processor may detect a deviation from the first schedule based on detecting triggers using the geofence data. In particular, a deviation may be detected if the processor determines that a device location of the user device lies outside of geofences associated with any of the projected routes for the first schedule. Additionally, or alternatively, a deviation may be detected if the user device is determined to be exiting a geofence associated with a projected route. The processor may detect location-based deviation from the first schedule based on the device context data which may include, for example, real-time location tracking data, user check-in data, and device usage data.

In some embodiments, a deviation from the first schedule may be detected upon receiving, via the user device, a request for activity data of at least one activity that is not included in the first schedule. For example, a user may request to receive information, such as location, travel route, menu, showtimes, and the like, about a venue (e.g., restaurant, coffee shop, theaters, etc.) that is not associated with any recommended activity of the first schedule. The processor may determine that the user is deviating or has deviated from the first schedule upon processing such request for activity data of a non-included activity.

In some embodiments, the processor may be configured to obtain account operations data for the resource account during a first time period. For example, the processor may continuously monitor operations or transactions data for the resource account during a defined time period associated with the first schedule. A deviation may be detected if one or more of the account operations for the resource account diverge from a set of expected operations that are associated with the recommended activities of the first schedule. As an example, the processor may detect a resource transfer, such as a payment transfer, from the resource account at a venue that is not associated with any of the recommended activities of the first schedule. As another example, the processor may detect that a quantum of an expected resource transfer at a recommended venue exceeds an average value or a defined maximum value. In such cases, the processor may determine that the detected one or more account operations of the resource account represent a deviation from an initial set of recommendations for the user.

In response to detecting a deviation from the first schedule, the processor provides, via the user device, a first notification including indications of the detected deviation and a recommendation of a second schedule of activities, in operation 312. The second schedule of activities may comprise an updated set of recommended activities that includes, at least, an activity associated with the detected deviation. In particular, the second schedule represents a modification of the first schedule in one or more activities that are recommended for the user. In at least some embodiments, the recommended activities of the second schedule may be identified based on, among others, current device location, geographical proximity/distance, resource cost (e.g., lowest cost activities), personal preference information, and historical activities and/or transactions data of the requesting user. The processor may generate a message identifying the detected deviation(s) and recommendation of the second schedule of activities, and transmit the message to the user device for display thereon.

The second schedule may be generated so to as to comply with certain constraints associated with the resource account. In some embodiments, constraints on resource usage, or transfer, may be set for activities which may be included in the second schedule. The constraints may relate to resource costs of individual activity items or a total resource cost associated with the second schedule. The processor may generate the revised schedule of recommended activities such that the individual activities and as well as the revised schedule as a whole are in compliance with the defined constraints associated with the resource account.

In some embodiments, the processor may be configured to detect one or more trigger conditions with respect to the account data of the resource account. In response to detecting any one of the trigger conditions, the processor may provide second notifications to the user device. For example, the processor may detect a trigger condition upon determining a current balance associated with the resource account and comparing the current balance with a defined threshold value.

Figure 4:
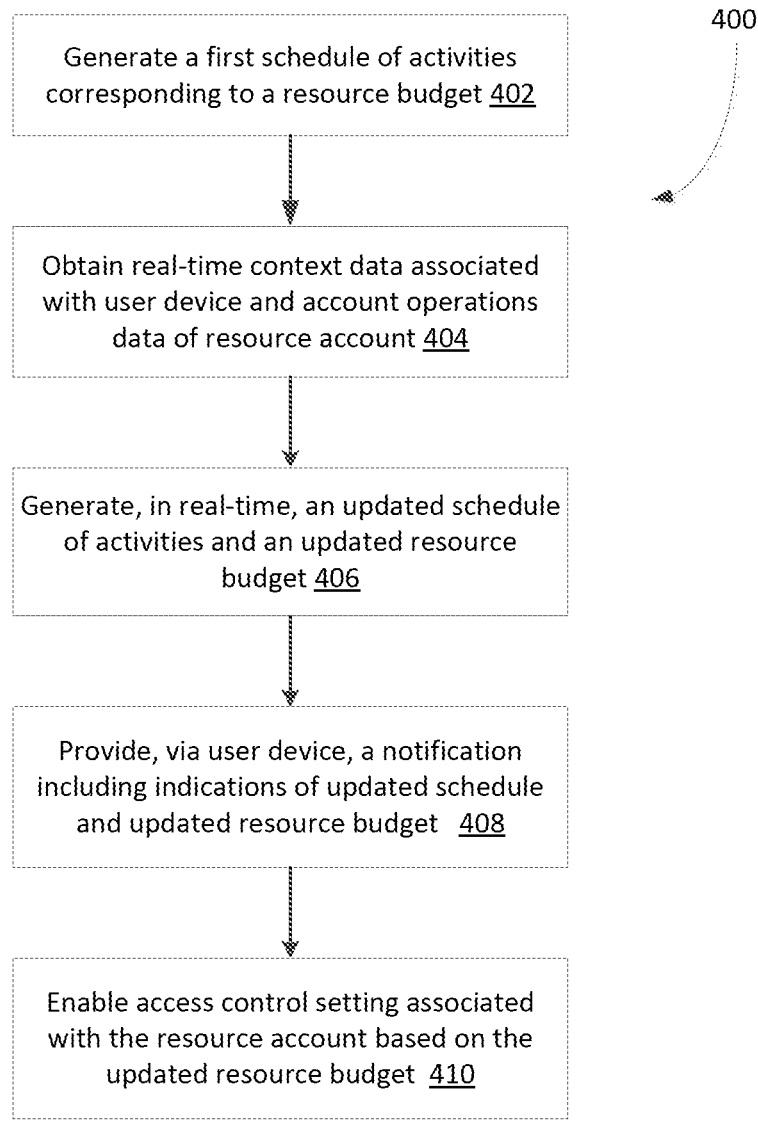
FIG. 4 shows, in flowchart form, an example method for controlling, in real-time, user access to a resource account based on current allocation and user device context data.

Reference is made to FIG. 4 which shows, in flowchart form, an example method 400 for controlling, in real-time, user access to a resource account. In accordance with method 400, access to a resource account may be managed based on current allocation and user context data. The operations of method 400 may be performed by a client device (e.g., by software resident on a device), either alone or in conjunction with one or more computer server systems. In particular, computer-executable instructions stored in memory of a client device (or a server computer) may, when executed by a processor of the client device (or server), configure the processor to perform the operations of method 400. The instructions corresponding to the operations of method 400 may be executed, for example, as part of software that is operable for providing notifications on the client device. The operations of method 400 may be performed in addition to, or as alternatives of, one or more of the operations of method 300.

In operation 402, the processor generates a first schedule of activities corresponding to a resource budget. The resource budget comprises a stored indication of an allocation of resources associated with a resource account. The resources may be allocated to one or more defined resource uses in accordance with the resource budget. The first schedule may comprise a set of recommended activities for a user that comply with any constraints associated with the resource budget. The resource budget may specify constraints on resource expenditure for various uses, such as maximum total resource cost or resource cost per use. The recommended activities may be identified based on criteria relating to geographical proximity (e.g., geographical distance from user device), resource cost (e.g., lowest cost activities), personal preference information, and historical activities and/or transactions data of the requesting user. The processor may store, in a memory, the first schedule in association with the resource account. Additionally, or alternatively, the processor may store the first schedule in association with a user device which may, in turn, be associated with one or more resource accounts.

In operation 404, the processor obtains real-time context data associated with a user device and account operations data of the resource account. The device context data may indicate, for example, at least one of: type of device, current device location, identity of device user, historical device usage, sensor data (e.g., orientation, acceleration, temperature, etc.), directional movement, travel path and trajectory, signal strength, and the like. The processor may obtain the device context data based on querying the device periodically or responsive to detection of certain defined conditions. The account operations include account-related activities which are initiated by authorized user(s) associated with the resource account. For example, the account operations may include resource transfers, deposits, and withdrawals in connection with the resource account. The processor may monitor account activity and usage, in real-time, to obtain relevant account operations data.

Upon obtaining the device context data and the account operations data, the processor generates, in real-time, an updated schedule of activities and an updated resource budget, in operation 406. The device context data and/or the account operations data may indicate that the relevant user has diverged from the set of recommended activities and associated activity data of the first schedule. For example, if a current device location indicates that the user is outside of or exiting a geofence associated with a projected route of the first schedule, the processor may determine that the user is deviating from the recommendations, including the set of recommended activities, associated with the first schedule.

Responsive to determining such divergence, the processor may generate an updated schedule of activities that includes a different set of recommended activities. In particular, the updated schedule is different from the first schedule in at least one activity and/or associated activity data. A resource budget associated with the resource account is updated to reflect changes in the schedule of recommended activities. Specifically, the processor may determine resource costs associated with the activities of the updated schedule and adjust the resource budget to either increase or decrease an available quantity of resources for deploying to recommended activities. The updated resource budget may be stored in memory, for example, as a replacement of an initial budget for the resource account.

In operation 408, the processor provides, via the user device, a notification including indications of updated schedule and updated resource budget. For example, the notification may be provided as a message that is transmitted to the user device for display thereon. The notification may be displayed, for example, via a graphical user interface of a resource account management or scheduling application resident on the user device.

In operation 410, the processor enables access control settings associated with the resource account based on the updated resource budget. Specifically, the processor may control access to the resources of the resource account such that resource usage by authorized entities complies with the updated resource budget. In some embodiments, the processor may impose limits on account operations associated with the resource account. For example, the processor may implement access control, or restrictions, for limiting the type, resource quantity, and timing associated with one or more account operations which may be performed in connection with the resource account. In the case that the updated resource budget allocates a reduced budget to one or more resource budget categories, the processor may be configured to permit only those account operations that are associated with reduced maximum resource quantities (e.g., lowered limits on resource transfers).

Figure 5:
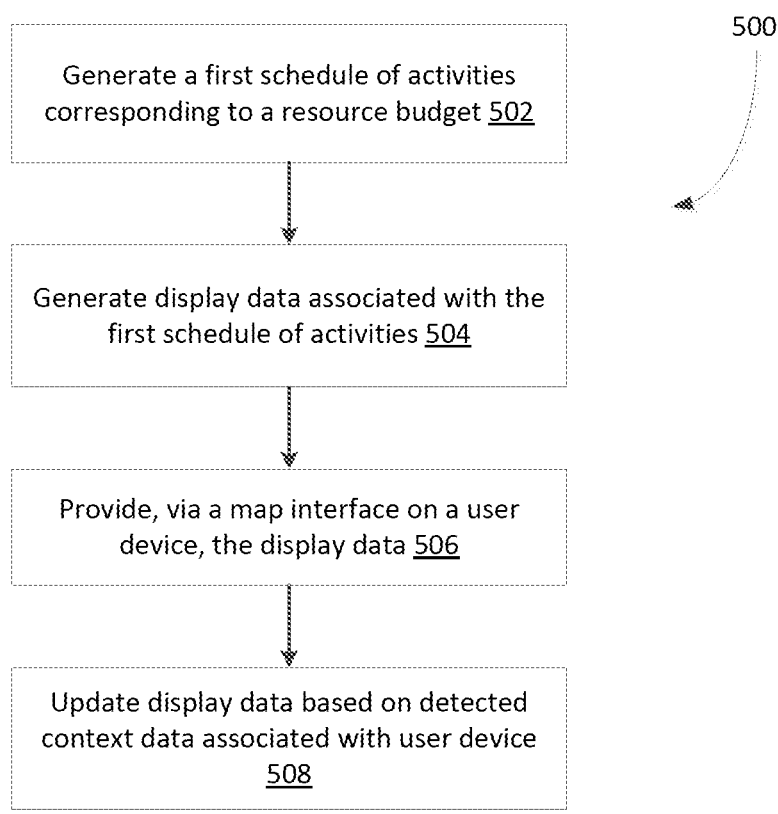
FIG. 5 shows, in flowchart form, another example method for providing contextual notifications in connection with a resource account.

Reference is made to FIG. 5 which shows, in flowchart form, another example method 500 for providing contextual notifications in connection with a resource account. The notifications are generated based on, at least, account data of a resource account associated with the user and context data associated with a device of the user. The operations of method 500 may be performed by a client device (e.g., by software resident on a device), either alone or in conjunction with one or more computer server systems. In particular, computer-executable instructions stored in memory of a client device (or a server computer) may, when executed by a processor of the client device (or server), configure the processor to perform the operations of method 500. The instructions corresponding to the operations of method 500 may be executed, for example, as part of software that is operable for providing notifications on the client device. The operations of method 500 may be performed in addition to, or as alternatives of, one or more of the operations of methods 300 and 400.

In operation 502, the processor generates a first schedule of activities corresponding to a resource budget. The first schedule may comprise a set of recommended activities for a user that complies with any constraints associated with the resource budget. The recommended activities may be identified based on criteria relating to geographical proximity (e.g., geographical distance from user device), resource cost (e.g., lowest cost activities), personal preference information, and historical activities and/or transactions data of the requesting user.

In operation 504, the processor generates display data associated with the first schedule of activities. The display data includes, at least, indications of recommended activities associated with the first schedule. For example, the display data may comprise graphical representations of identifying information for each of a plurality of recommended activities, such as activity name, type of activity, venue identifier(s), average resource cost, and the like. The processor then provides the display data via a map interface on a user device, in operation 506. In some embodiments, the map interface may be included in a graphical user interface associated with an application, such as a resource allocation or scheduling application. The map interface may provide graphical representations of a current user and/or device location and a subset of recommended activities of the first schedule. The subset of recommended activities may include those activities that are determined to be within a defined geographical proximity of the current user/device location.

In operation 508, the processor updates the display data based on detected context data associated with the user device. For example, when the user device is moved, the map interface may be updated to represent the device location as well as the set of recommended activities of the first schedule that are displayed via the map interface. Other context data such as direction of motion, acceleration, etc. associated with the user device may be used to determine routes or projected routes of the user device, and the route information informs the updating of the display data on the map interface.

In some embodiments, the device context data may be supplemented by account data of a resource account associated with the first schedule in updating the display data for the map interface. By way of example, account operations data, including historical resource usage and operations, may be used in identifying the set of recommended activities of the first schedule to represent graphically via the map interface.

Figure 6:
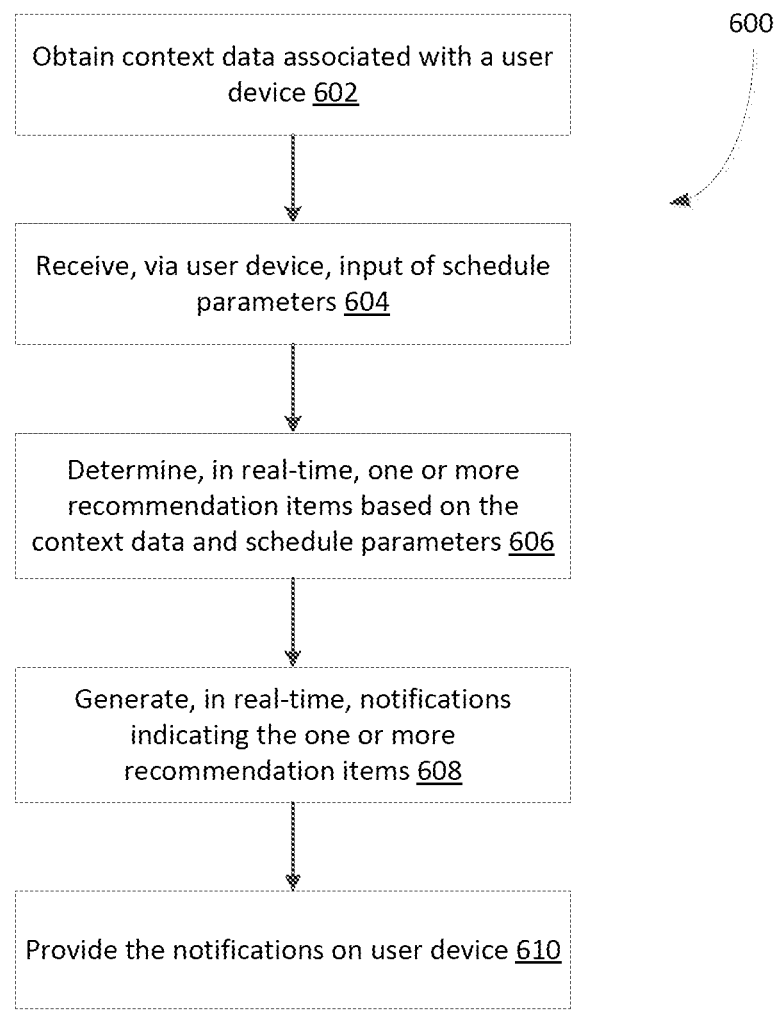
FIG. 6 shows, in flowchart form, another example method for providing contextual notifications in connection with a resource account.

Reference is made to FIG. 6 which shows, in flowchart form, another example method 600 for providing contextual notifications in connection with a resource account. The notifications are generated based on, at least, account data of a resource account associated with the user and context data associated with a device of the user. The operations of method 600 may be performed by a client device (e.g., by software resident on a device), either alone or in conjunction with one or more computer server systems. In particular, computer-executable instructions stored in memory of a client device (or a server computer) may, when executed by a processor of the client device (or server), configure the processor to perform the operations of method 600. The instructions corresponding to the operations of method 600 may be executed, for example, as part of software that is operable for providing notifications on the client device. The operations of method 600 may be performed in addition to, or as alternatives of, one or more of the operations of methods 300 to 500.

In operation 602, the processor obtains real-time context data associated with a user device. The device context data may indicate, for example, at least one of: type of device, current device location, identity of device user, historical device usage, sensor data (e.g., orientation, acceleration, temperature, etc.), directional movement, travel path and trajectory, signal strength, and the like. The processor may obtain the device context data based on querying the device periodically or responsive to detection of certain defined conditions.

In operation 604, the processor receives, via a user device, input of schedule parameters. Specifically, the processor may receive input of schedule defining information from a user associated with the user device. The schedule parameters may include, for example: schedule start date and time, indication of geographical region (e.g., neighbourhood), types of schedule items and/or activities, resource costs, and the like. The processor determines, in real-time, one or more recommendation items based on the context data and the schedule parameters, in operation 606.

In operation 608, the processor generates, in real-time, notifications indicating the one or more recommendation items. The notifications may comprise messages that indicate details of the recommendation items and that are in a form for transmission to the user device. The processor then provides the notifications on the user device, in operation 610. For example, the notifications may be provided via an application, such as a scheduling or resource account management application, or as messages (e.g., email, SMS, etc.).

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a processor; and
a memory coupled to the processor, the memory storing computer-executable instructions that, when executed by the processor, configure the processor to:
receive, via a user device associated with a resource account, input of parameters associated with a first task comprising a plurality of account operations and a first allocation of resources of the resource account in connection with the first task;
generate a first schedule of recommended operations for the first task based on the inputted parameters and account data of the resource account, the first schedule defining an order associated with the recommended operations;
obtain real-time context data associated with the user device based on tracking at least one of real-time location or device usage data of the user device;
detect a deviation from expected account operations or projected route data associated with the first schedule based on the obtained real-time context data and account data of the resource account; and
in response to detecting the deviation:
provide, via the user device, a first notification including indications of the detected deviation and a recommendation of an updated resource allocation; and
enable access control of resources of the resource account based on restricting account operations associated with the resource account in accordance with the updated resource allocation.

2. The computing system of claim 1, wherein generating the recommendation of the first schedule comprises providing, to the user device for display thereon, display data associated with a map interface, the display data including graphical representations of the one or more activities.

3. The computing system of claim 2, wherein the display data includes indications of locations and projected costs associated with the recommended operations.

4. The computing system of claim 1, wherein the real-time context data comprises a current location of the user device.

5. The computing system of claim 1, wherein detecting the deviation comprises defining geofences relative to projected routes associated with the first schedule and detecting triggers using geofence data.

6. The computing system of claim 1, wherein providing the first notification comprises generating a message identifying the deviation and the recommendation of the updated resource allocation and transmitting the message to the user device.

7. The computing system of claim 1, wherein the instructions, when executed, further configure the processor to detect one or more trigger conditions with respect to the account data of the resource account and providing second notifications to the user device in response to detecting the one or more trigger conditions.

8. The computing system of claim 7, wherein detecting the one or more trigger conditions comprises determining a current balance associated with the resource account and comparing the current balance with a defined threshold value.

9. The computing system of claim 1, wherein the instructions, when executed, further configure the processor to obtain account operations data for the resource account during a first time period associated with the first task and wherein the recommendation of the updated resource allocation is generated based on the account operations data.

10. The computing system of claim 1, wherein detecting the deviation from the first schedule comprises receiving, via the user device, a request for activity data of at least one activity that is not included in the first schedule.

11. A computer-implemented method, comprising:
receiving, via a user device associated with a resource account, input of parameters associated with a first task comprising a plurality of account operations and a first allocation of resources of the resource account in connection with the first task;
generating a first schedule of recommended operations for the first task based on the inputted parameters and account data of the resource account, the first schedule defining an order associated with the recommended operations;
obtaining real-time context data associated with the user device based on tracking at least one of real-time location or device usage data of the user device;
detecting a deviation from expected account operations or projected route data associated with the first schedule based on the obtained real-time context data and account data of the resource account; and
in response to detecting the deviation:
providing, via the user device, a first notification including indications of the detected deviation and a recommendation of an updated resource allocation; and
enabling access control of resources of the resource account based on restricting account operations associated with the resource account in accordance with the updated resource allocation.

12. The method of claim 11, wherein generating the recommendation of the first schedule comprises providing, to the user device for display thereon, display data associated with a map interface, the display data including graphical representations of the one or more activities.

13. The method of claim 12, wherein the display data includes indications of locations and projected costs associated with the recommended operations.

14. The method of claim 11, wherein the real-time context data comprises a current location of the user device.

15. The method of claim 11, wherein detecting the deviation comprises defining geofences relative to projected routes associated with the first schedule and detecting triggers using geofence data.

16. The method of claim 11, wherein providing the first notification comprises generating a message identifying the deviation and the recommendation of the updated resource allocation and transmitting the message to the user device.

17. The method of claim 11, further comprising detecting one or more trigger conditions with respect to the account data of the resource account and providing second notifications to the user device in response to detecting the one or more trigger conditions.

18. The method of claim 17, wherein detecting the one or more trigger conditions comprises determining a current balance associated with the resource account and comparing the current balance with a defined threshold value.

19. The method of claim 11, further comprising obtaining account operations data for the resource account during a first time period associated with the first task and wherein the recommendation of the updated resource allocation is generated based on the account operations data.

20. The method of claim 11, wherein detecting the deviation from the first schedule comprises receiving, via the user device, a request for activity data of at least one activity that is not included in the first schedule.

\* \* \* \* \*